US007953622B2

(12) United States Patent
Ogle et al.

(10) Patent No.: US 7,953,622 B2
(45) Date of Patent: *May 31, 2011

(54) IMPLEMENTING MEETING MODERATOR FAILOVER AND FAILBACK

(75) Inventors: David M. Ogle, Cary, NC (US); Patrick J. O'Sullivan, Dublin (IE); Susan D. Shaye, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/134,947

(22) Filed: Jun. 6, 2008

(65) Prior Publication Data
US 2008/0243585 A1 Oct. 2, 2008

Related U.S. Application Data

(63) Continuation of application No. 11/325,140, filed on Jan. 3, 2006.

(51) Int. Cl.
G06F 9/44 (2006.01)
(52) U.S. Cl. ..................................................... 705/7.19
(58) Field of Classification Search .................. None
See application file for complete search history.

(56) References Cited

U.S. PATENT DOCUMENTS

| 5,369,693 | A  | * | 11/1994 | Pillet et al. ............... 379/203.01 |
| 5,903,637 | A  | * | 5/1999  | Hogan et al. ............. 379/203.01 |
| 6,598,075 | B1 | * | 7/2003  | Ogdon et al. ................. 709/204 |
| 6,757,530 | B2 | * | 6/2004  | Rouse et al. ............... 455/412.1 |
| 6,839,417 | B2 | * | 1/2005  | Weisman et al. ........ 379/204.01 |
| 7,133,896 | B2 | * | 11/2006 | Ogdon et al. ................. 709/205 |
| 7,379,968 | B2 | * | 5/2008  | Schuh .......................... 709/204 |
| 7,533,146 | B1 | * | 5/2009  | Kumar ......................... 709/205 |
| 7,634,546 | B1 | * | 12/2009 | Strickholm et al. .......... 709/207 |
| 7,765,257 | B2 | * | 7/2010  | Chen et al. .................... 709/204 |
| 2003/0046344 | A1 | * | 3/2003 | Kumhyr et al. ............... 709/205 |
| 2004/0047461 | A1 | * | 3/2004 | Weisman et al. ........ 379/202.01 |
| 2004/0105395 | A1 | * | 6/2004 | Friedrich et al. .............. 370/261 |
| 2004/0153558 | A1 | * | 8/2004 | Gunduc et al. ................ 709/229 |
| 2005/0036509 | A1 | * | 2/2005 | Acharya et al. ............... 370/466 |
| 2005/0132048 | A1 | * | 6/2005 | Kogan et al. .................. 709/225 |
| 2005/0152523 | A1 | * | 7/2005 | Fellenstein et al. ...... 379/202.01 |

(Continued)

OTHER PUBLICATIONS

Breeze Meeting User Guide for Meeting Participants (2005). Macromedia Inc. 1-50.*

(Continued)

Primary Examiner — Romain Jeanty
Assistant Examiner — Brett Feeney
(74) Attorney, Agent, or Firm — Kunxler Needham Massey & Thorpe

(57) ABSTRACT

A method, apparatus, and computer-usable medium for scheduling a meeting, determining a set of policies for selecting a replacement meeting moderator if an original meeting moderator is not present in the meeting, specifying the a set of policies for reestablishing control of the meeting to the original meeting moderator when the original meeting moderator rejoins the meeting, deciding whether to implement a default policy or a custom policy as the set of policies. The default policy includes examining a user directory, establishing a hierarchy ranking of a collection of meeting members, where the original meeting moderator holds the highest rank, and designating a member of the collection of meeting members as a replacement meeting moderator, where the member holds a next highest rank in the hierarchy ranking.

17 Claims, 13 Drawing Sheets

U.S. PATENT DOCUMENTS

| | | | |
|---|---|---|---|
| 2005/0273510 A1* | 12/2005 | Schuh | 709/225 |
| 2006/0080657 A1* | 4/2006 | Goodman | 717/177 |
| 2006/0212453 A1* | 9/2006 | Eshel et al. | 707/10 |
| 2006/0234613 A1* | 10/2006 | Hans et al. | 452/58 |
| 2006/0265262 A1* | 11/2006 | Kamdar et al. | 705/8 |
| 2007/0067387 A1* | 3/2007 | Jain et al. | 709/204 |
| 2007/0150583 A1* | 6/2007 | Asthana et al. | 709/224 |

OTHER PUBLICATIONS

GoToMeeting User Guide Version 2.0. (Product Release Aug. 2005). 1-81.*

* cited by examiner

IMPLEMENTING MEETING MODERATOR FAILOVER AND FAILBACK

CROSS-REFERENCE TO RELATED APPLICATIONS

The present application is a continuation of U.S. patent application Ser. No. 11/325,140, filed on Jan. 3, 2006, entitled "System and Method for Implementing Meeting Moderator Failover and Failback". Applicants claim benefit of priority under 35 U.S.C. §120 to U.S. patent application Ser. No. 11/325,140, which is incorporated by reference herein in its entirety and for all purposes.

BACKGROUND OF THE INVENTION

The present invention relates in general to the field of computers and similar technologies, and in particular to software utilized in this field.

Early computers were stand-alone units, which accessed and processed only local databases using local computer programs. Today, however, modern computers are often networked, thus providing client computers on a network access to a variety of resources, including data, computer programs, hardware devices (including storage drives and printers), etc. This resource availability is especially prevalent with the advent of the Internet, World Wide Web, private intranets and extranets, etc., which provide access to web pages, databases, programs, and similar resources. Development of software for modern computers, once a task performed by a single programmer or a small group of programmers, is now performed by teams of developers and associated technical writers that document the software.

Electronic meetings (e-meetings) are become a popular means of communication in today's business world. Each e-meeting includes a "moderator" or "owner" who may delegate capabilities to other users. Those with skill in the art will appreciate that current e-meeting design and methodology creates several difficulties.

For example, if the moderator does not attend the e-meeting at the scheduled time, the e-meeting cannot proceed. Also, if the moderator becomes unavailable (e.g., network difficulties, hardware problems, or the moderator is called to another meeting, etc.) before the moderator can delegate capabilities to other users, the e-meeting becomes stalled. If the e-meeting is scheduled by a system administrator who inadvertently lists themselves as the moderator of the meeting, the intended moderator of the meeting cannot perform any actions within the meeting until the administrator changes the settings of the e-meeting. Also, if the original moderator delegates capabilities to another user, leaves the meeting, and subsequently returns, the new moderator must manually re-delegate the capabilities back to the original moderator.

Therefore, there is a need for a system and method of implementing meeting moderator failback and failover to address the above mentioned limitations of the prior art.

SUMMARY OF THE INVENTION

The present invention includes, but is not limited to, a method, apparatus, and computer-usable medium for scheduling a meeting, and determining a set of policies for selecting a replacement meeting moderator if an original meeting moderator is not present in the meeting.

In one embodiment, the method includes the steps of specifying the a set of policies for reestablishing control of the meeting to the original meeting moderator when the original meeting moderator rejoins the meeting, deciding whether to implement a default policy or a custom policy as the set of policies. The default policy includes examining a user directory, establishing a hierarchy ranking of a collection of meeting members, where the original meeting moderator holds the highest rank, and designating a member of the collection of meeting members as a replacement meeting moderator, where the member holds a next highest rank in the hierarchy ranking.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
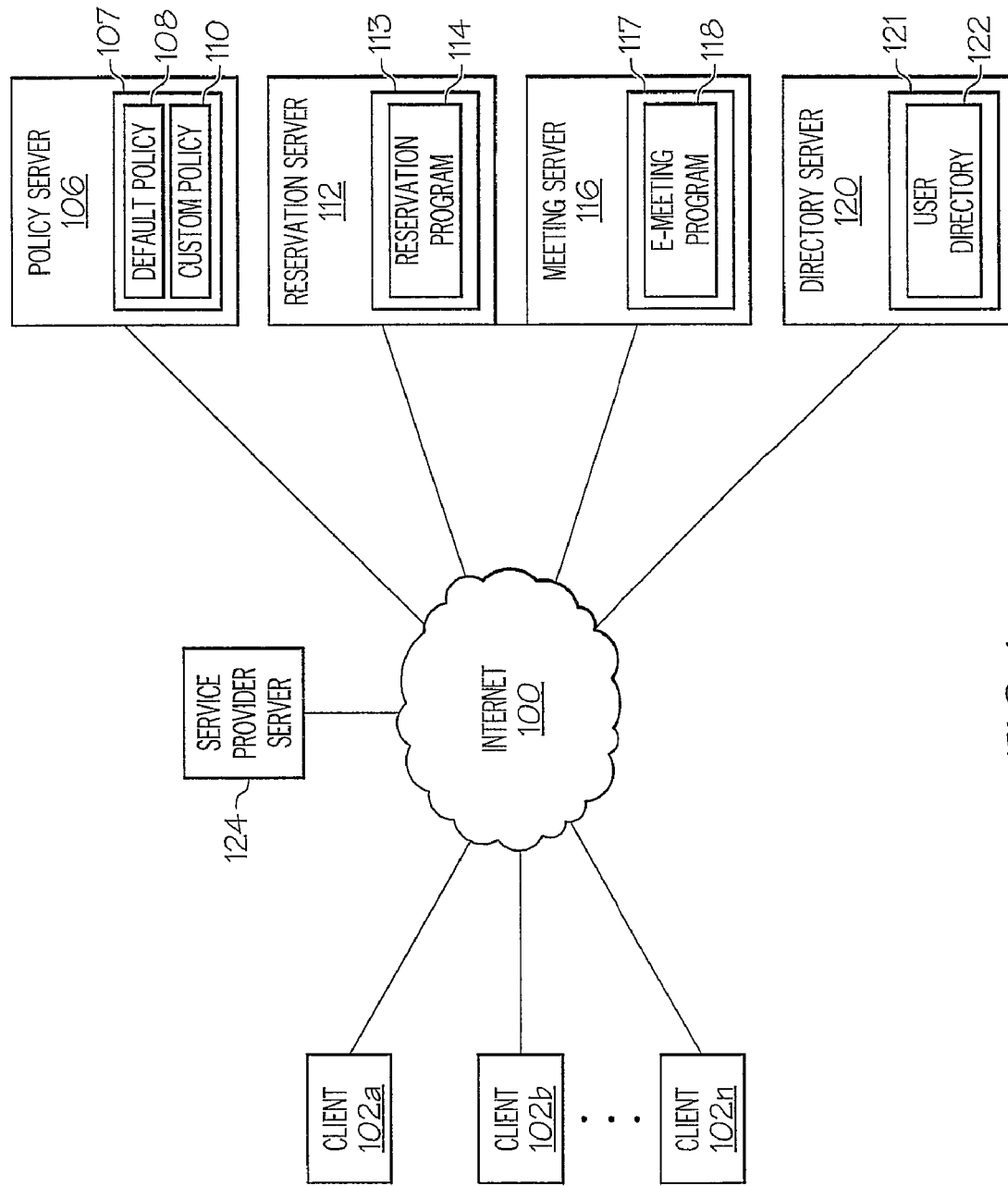
FIG. 1 illustrates an exemplary network in which a preferred embodiment of the present invention may be implemented.

Referring now to the figures, and in particular, referring to FIG. 1 there is illustrated an exemplary network in which a preferred embodiment of the present invention may be implemented. As depicted, network 100 includes clients 102a-n, Internet 104, service provider server 124, policy server 106, reservation server 112, meeting server 116, and directory server 120.

Clients 102a-n are implemented as computer systems (e.g., data processing system 200 of FIG. 2) that are coupled to Internet 104 via a modem, network interface card (NIC), or any other type of network interface. In a preferred embodiment of the present invention, clients 102a-n are implemented as users of an electronic meeting system where one of the clients 102a-n is designated as a meeting moderator. Service provider server 124 is coupled to Internet 104 and described herein in more detail in conjunction with FIGS. 5*a-b*, 6*a-c*, 7*a-b*, and 8*a-b*.

Reservation server 112 includes memory 113, which further includes reservation program 114. Clients 102*a-n* access reservation program 114 to schedule electronic meetings and indicate whether default policy 108 or custom policy 110 will be utilized during the electronic meeting. Users (e.g., one of clients 102*a-n*) access reservation program 114 to specify the time, location, number of participants, identity of the participants, and specify which failover and failback policy (stored in memory 107 of policy server 106), if any, will be utilized during the e-meeting.

Policy server 106 includes memory 107, which further includes default policy 108 and custom policy 110, which are utilized to determine a new meeting moderator in the event the originally designated meeting moderator is unavailable.

In a preferred embodiment of the present invention, default policy 108 may include a simple algorithm for designating a new meeting moderator such as a default failover to the next person on a meeting attendee list, or a more sophisticated algorithm where policy server 106 accesses memory 121 of directory server 120, retrieves the listed position of all meeting attendees, and designates the attendee with the next highest position (e.g., assistant manager, etc.) as the new moderator. Assigning a meeting attendee with the next highest position as meeting moderator allows the e-meeting to continue even if the originally designated moderator does not attend the meeting. Custom policy 110 is a failover and failback policy that is specified by a user to apply to the specifically scheduled meeting. For example, if a manager schedules a meeting utilizing reservation program 114, he may specify a specific hierarchy of meeting attendees that may be designated as meeting moderator (e.g., assistant manager, shift manager, etc.)

Meeting server 116 includes memory 117, which further includes electronic meeting (e-meeting) program 118. At the meeting time scheduled with reservation program 114, clients 102*a-n* log on to e-meeting program 118 to hold a meeting. Directory server 120 includes memory 121, which further includes user directory 122. User directory 122 is a database containing information (e.g., position, contact, and location, etc.) regarding registered users of e-meeting program 118.

Those skilled in the art will appreciate that network 100 can include many additional components (e.g., routers, firewalls, etc.) not specifically illustrated in FIG. 1. Because such additional components are not necessary for an understanding of the present invention, they are not illustrated in FIG. 1 or discussed further herein.

Figure 2:
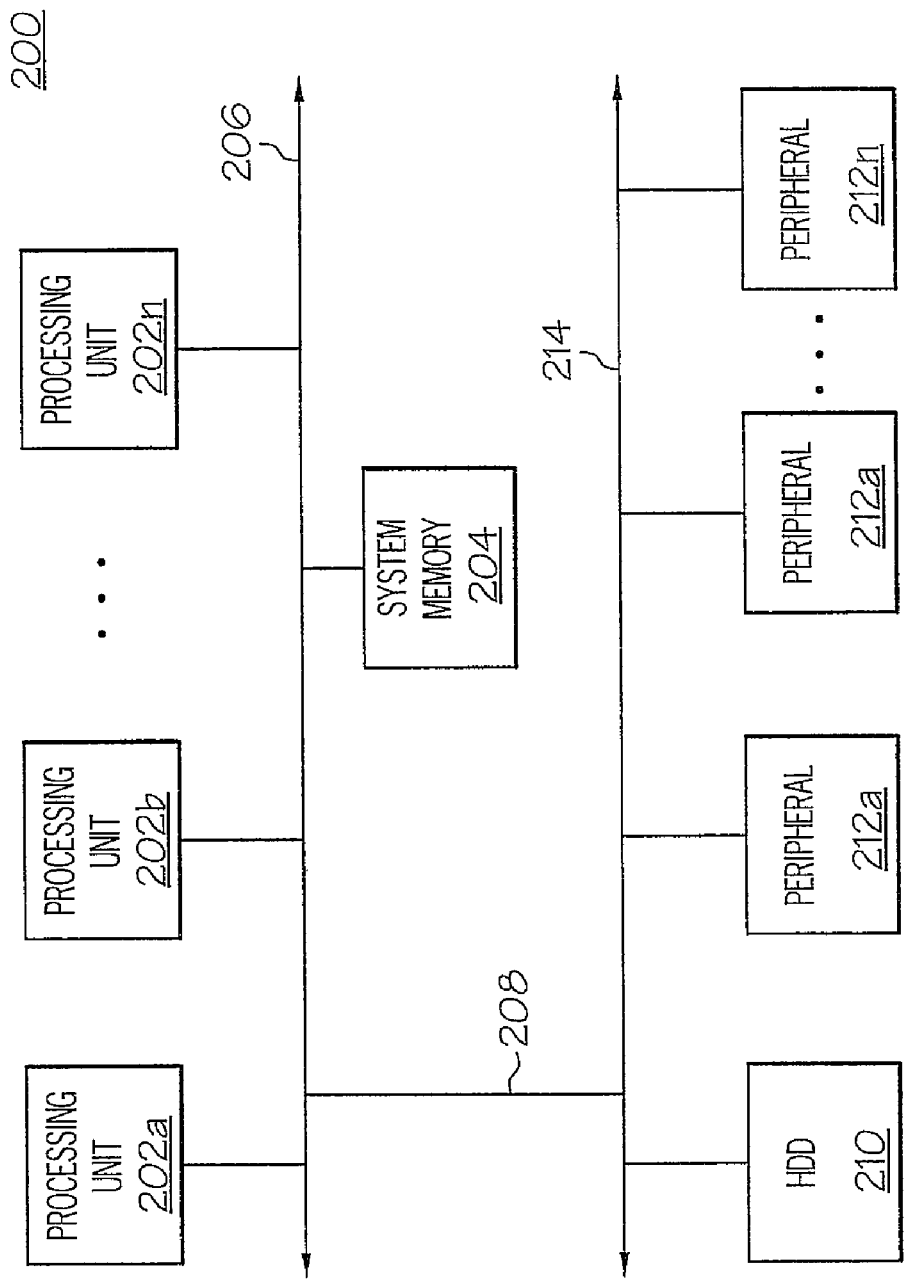
FIG. 2 is a block diagram depicting an exemplary data processing system in which a preferred embodiment of the present invention may be implemented.

FIG. 2 is a block diagram illustrating an exemplary data processing system 200 in which a preferred embodiment of the present invention may be implemented. Those with skill in the art will appreciate that data processing system 200 may be utilized to implement both clients 102*a-n* and servers 106, 112, 116, 120, and 124. As depicted, exemplary data processing system 200 includes processing unit(s) 202, shown as processing units 202*a* and 202*b* in FIG. 1, which are coupled to system memory 204 via system bus 206. Preferably, system memory 204 may be implemented as a collection of dynamic random access memory (DRAM) modules. Typically, system memory 204 includes data and instructions for running a collection of applications. Mezzanine bus 208 acts as an intermediary between system bus 206 and peripheral bus 214. Those with skill in this art will appreciate that peripheral bus 214 may be implemented as a peripheral component interconnect (PCI), accelerated graphics port (AGP), or any other peripheral bus. Coupled to peripheral bus 214 is hard disk drive 210, which is utilized by data processing system 200 as a mass storage device. Also coupled to peripheral bus 214 is a collection of peripherals 212*a-n*.

Figure 3:
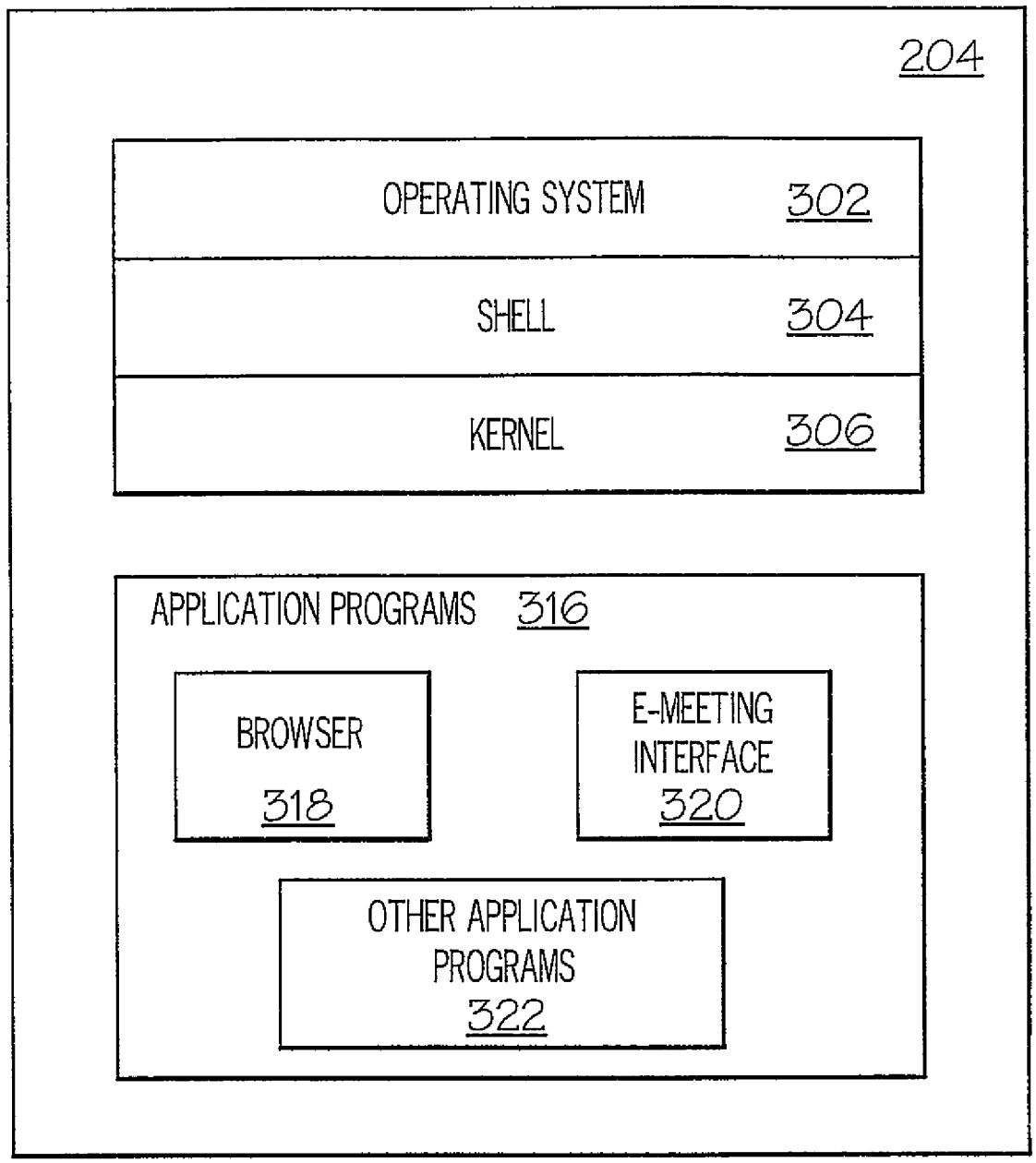
FIG. 3 is a block diagram illustrating exemplary contents of the system memory depicted in FIG. 2, according to a preferred embodiment of the present invention.

FIG. 3 is a block diagram illustrating exemplary contents of system memory 204 of clients 102*a-n*, according to a preferred embodiment of the present invention. As illustrated, system memory 204 includes operating system 302, which further includes shell 304 for providing transparent user access to resources such as application programs 316. Generally, shell 304 is a program that provides an interpreter and an interface between the user and the operating system. More specifically, shell 304 executes commands that are entered into a command line user interface or a file. Thus, shell 304 (as it is called in UNIX®), also called a command processor in Windows®, is generally the highest level of the operating system software hierarchy and servers as a command interpreter. The shell provides a system prompt, interprets commands entered by keyboard, mouse, or other user input media, and sends the interpreted command(s) to the appropriate lower levels of the operating system (e.g., kernel 306) for processing. Note that while shell 304 is a text-based, line-oriented user interface, the present invention will support other user interface modes, such as graphical, voice, gestural, etc. equally well.

As illustrated, operating system 302 also includes kernel 306, which includes lower levels of functionality for operating system 302, including providing essential services required by other parts of operating system 302 and application programs 316, including memory management, process and task management, disk management, and mouse and keyboard management. Application programs 316 can include a browser 318, utilized for access to Internet 104, e-meeting interface 320, word processors, spreadsheets, and other application programs 322.

Figure 4:
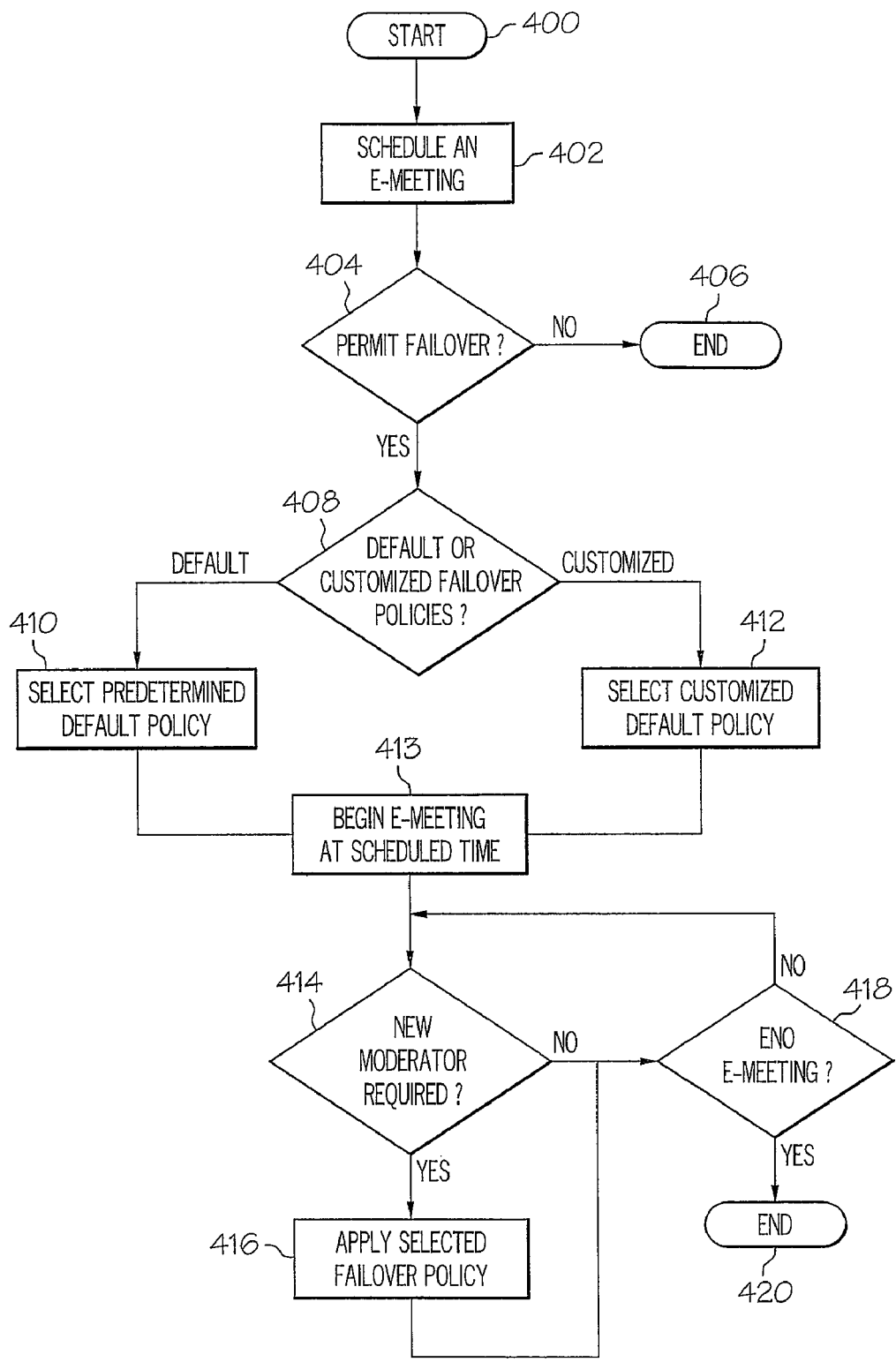
FIG. 4 is a high-level logical flowchart depicting an exemplary method of implementing meeting moderator failover and failback according to a preferred embodiment of the present invention.
Figure 5A:
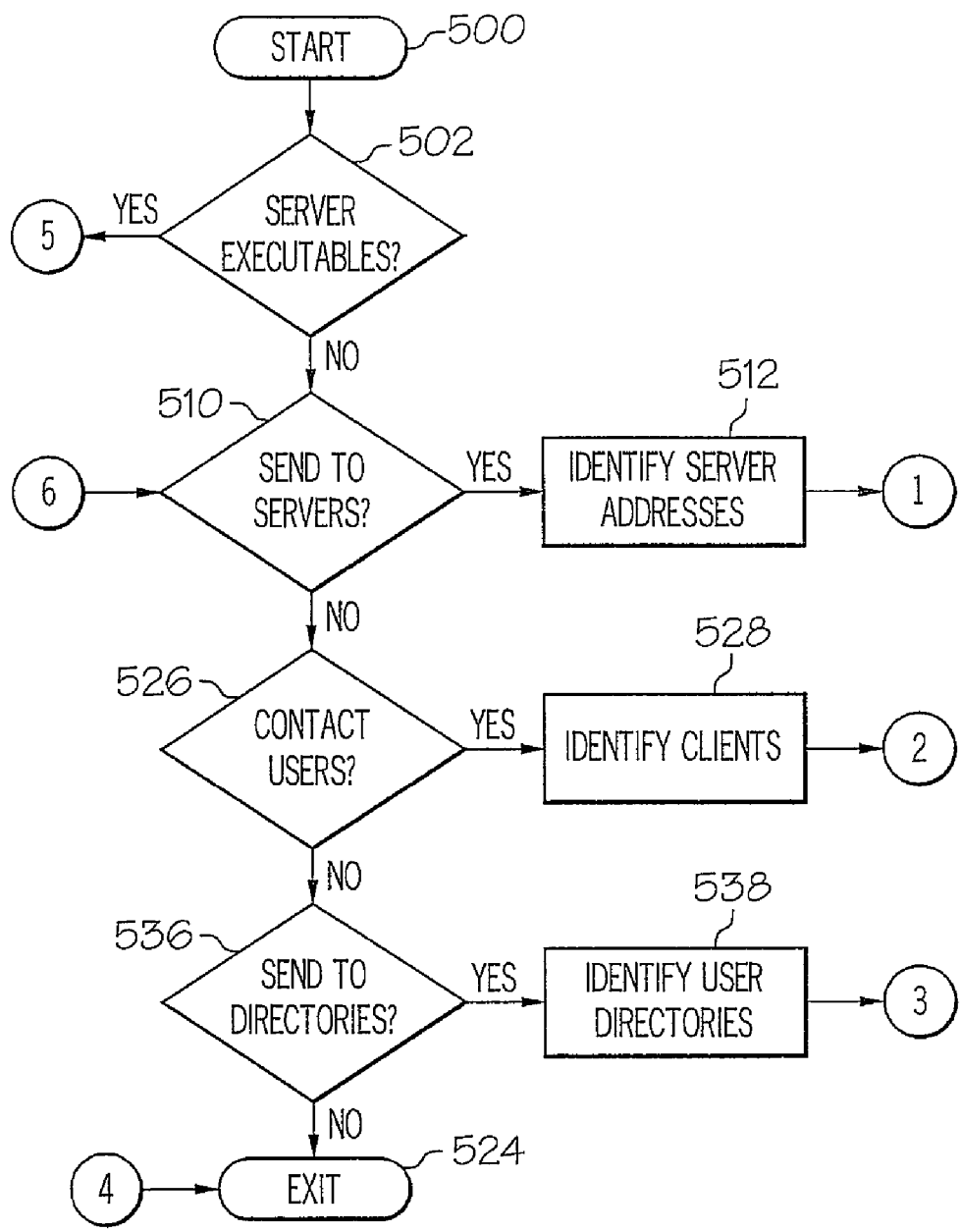
FIGS. 5a-b show a flow-chart of steps taken to deploy software capable of executing the steps shown and described in FIG. 4.
Figure 5B:
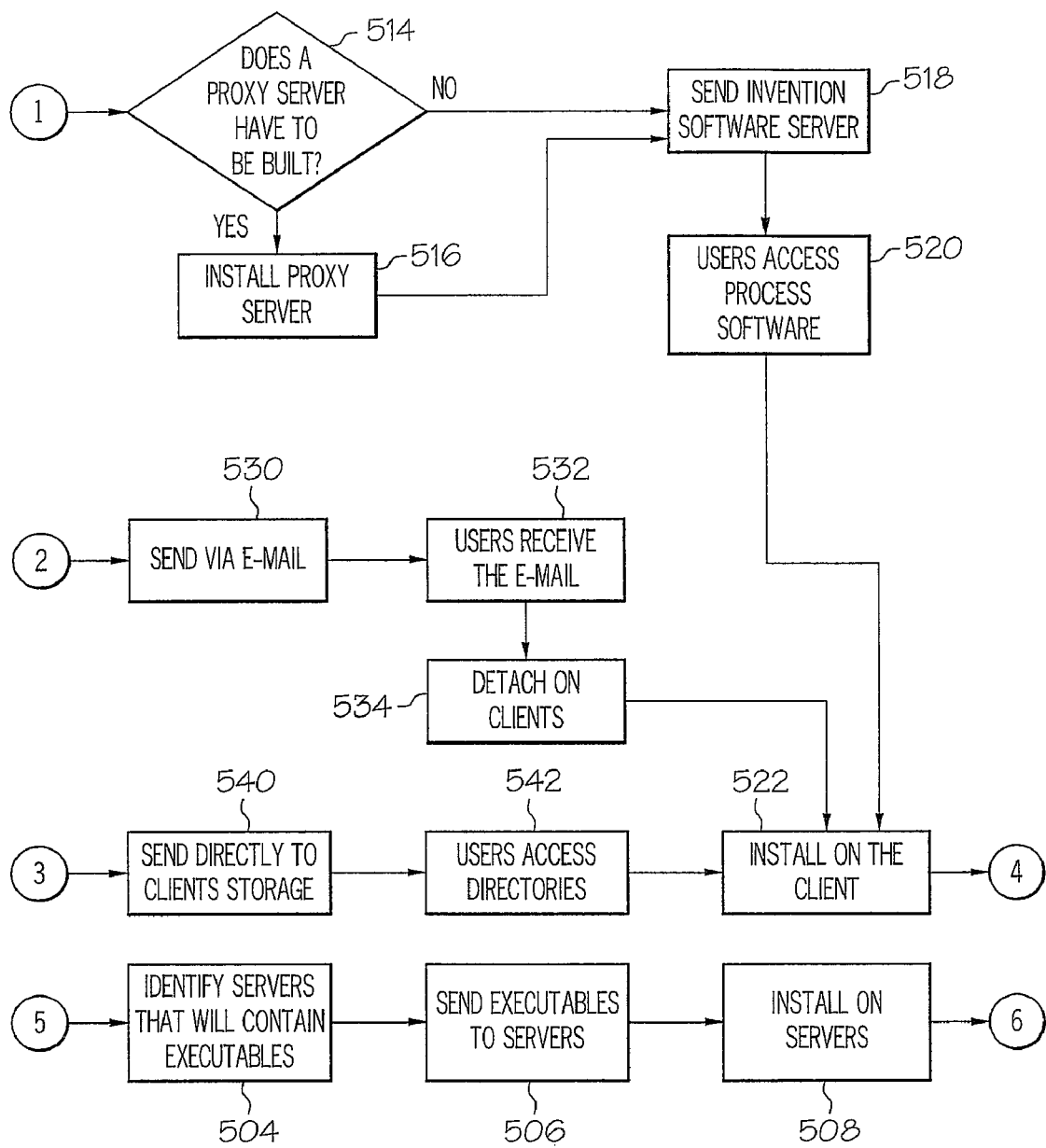
Figure 6A:
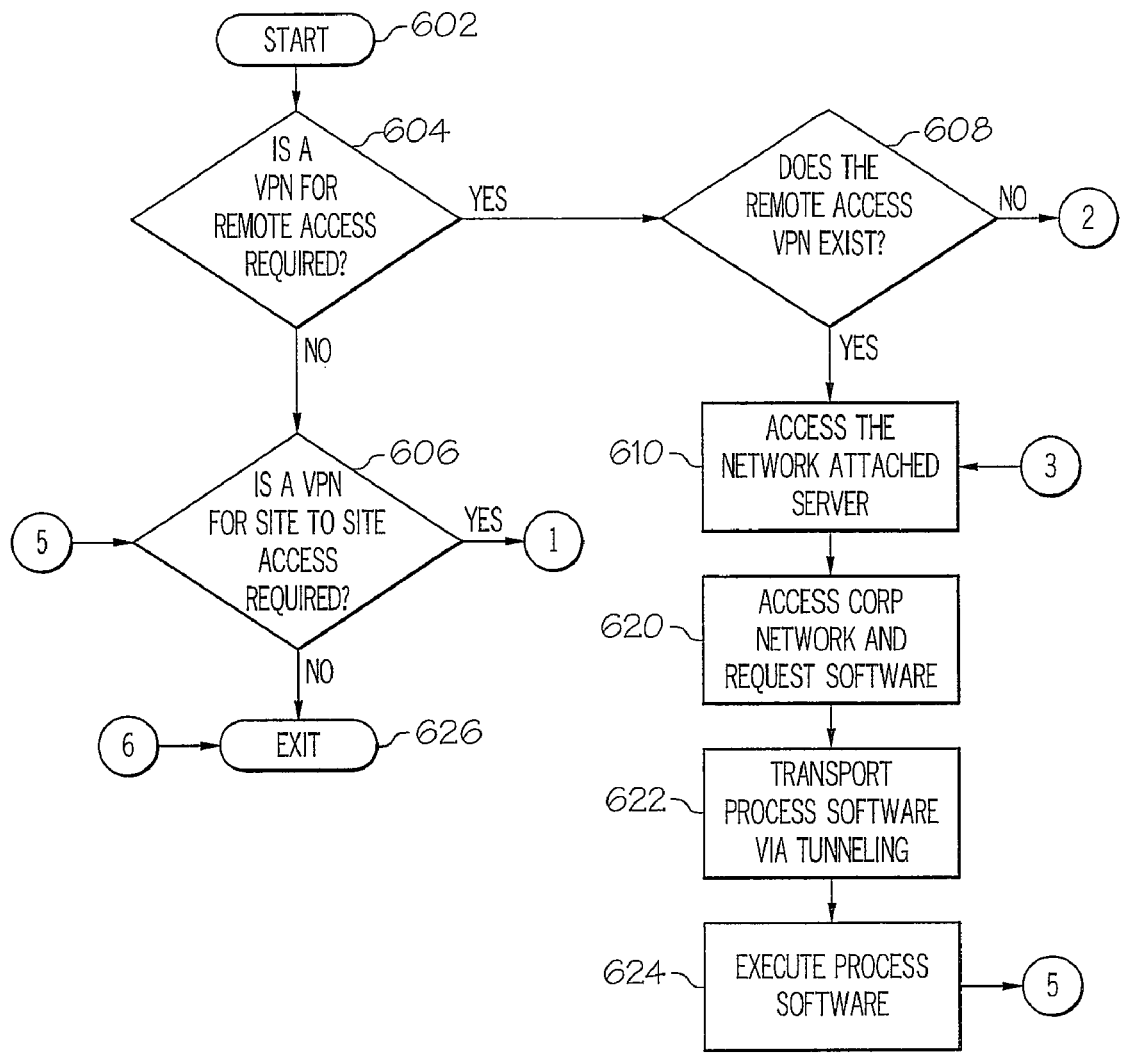
FIGS. 6a-c show a flow-chart of steps taken to deploy in a Virtual Private Network (VPN) software that is capable of executing the steps shown and described in FIG. 4.
Figure 6B:
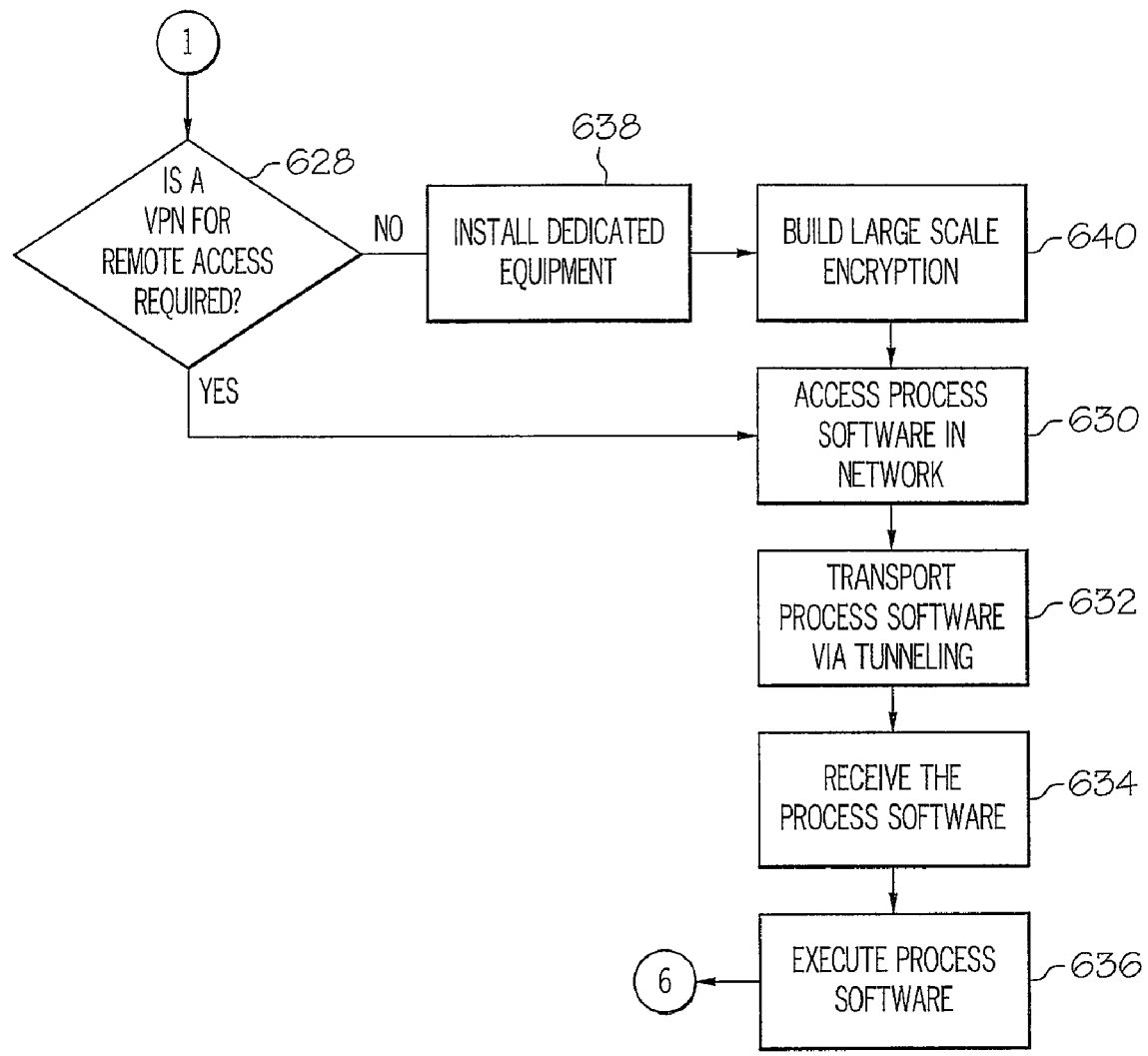
Figure 6C:
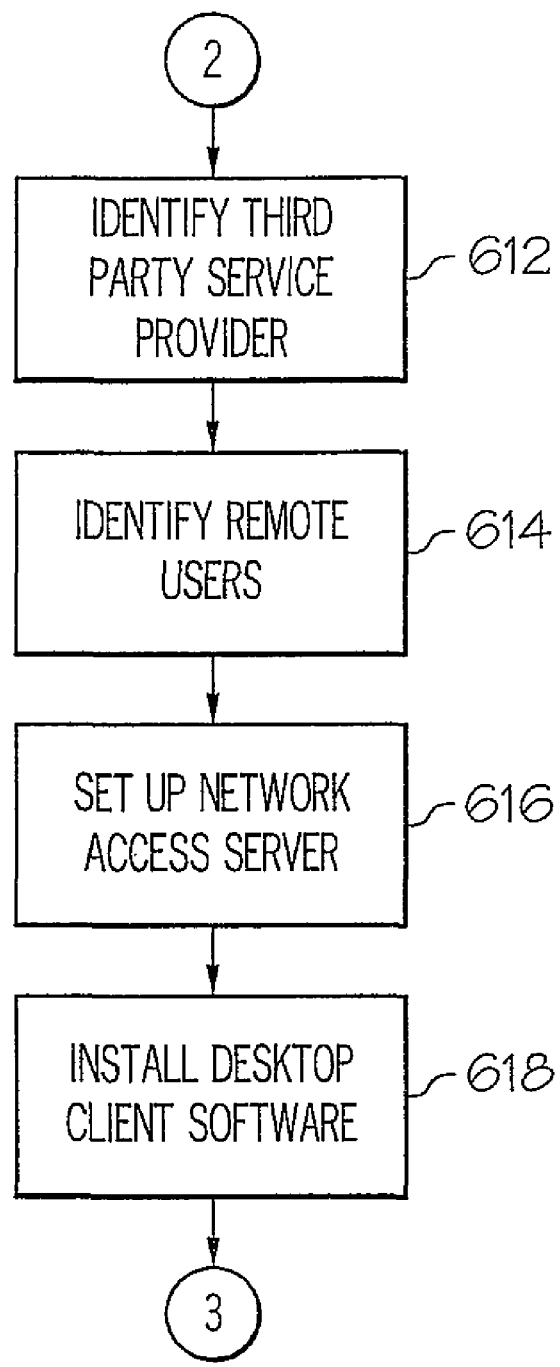
Figure 7A:
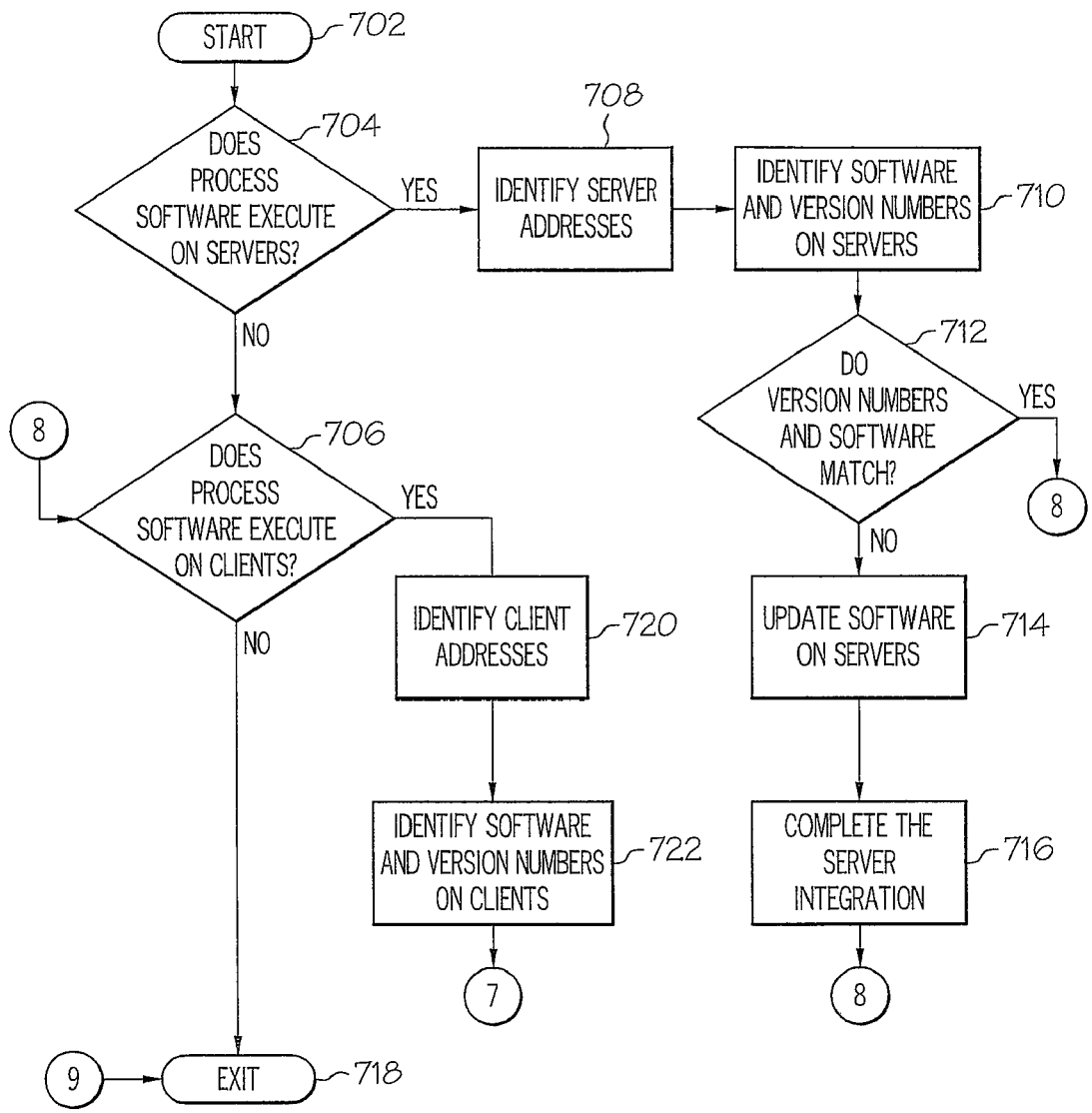
FIGS. 7a-b show a flow-chart showing steps taken to integrate into a computer system software that is capable of executing the steps shown and described in FIG. 4.
Figure 7B:
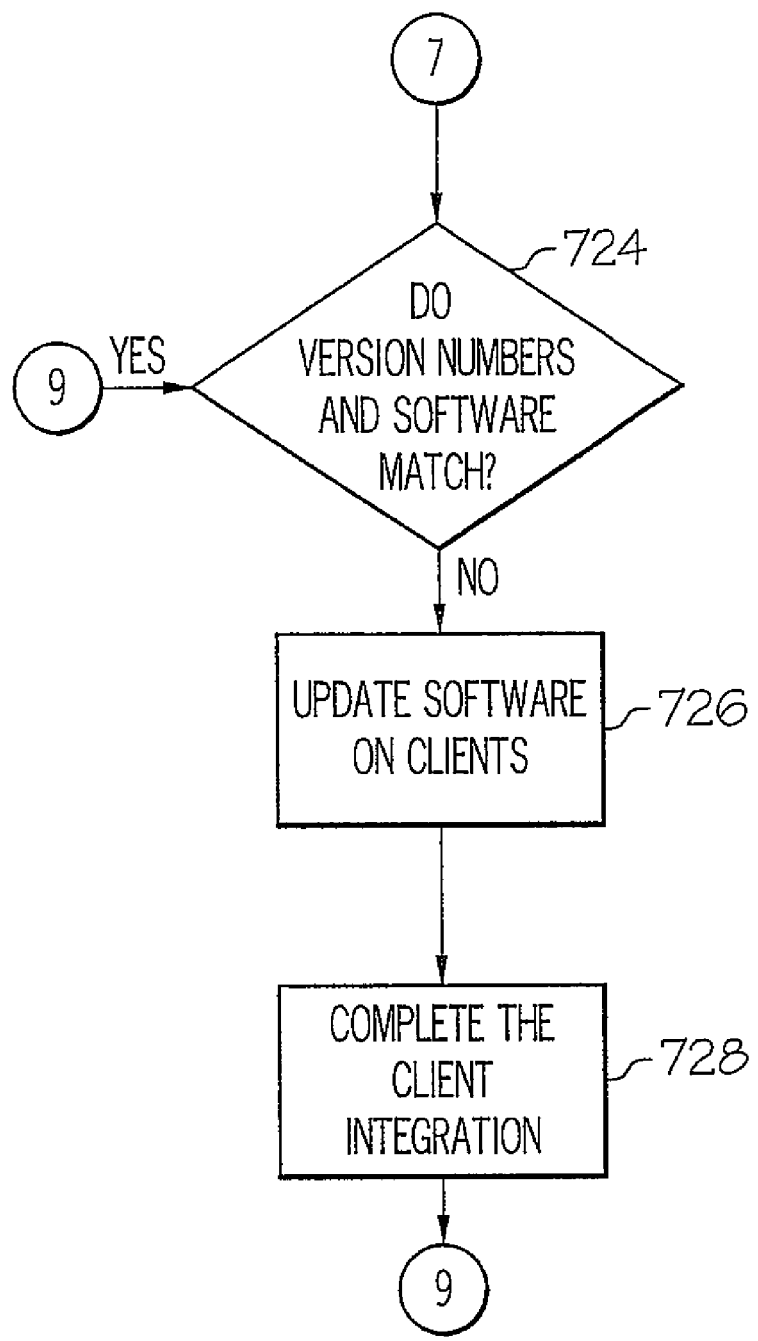
Figure 8A:
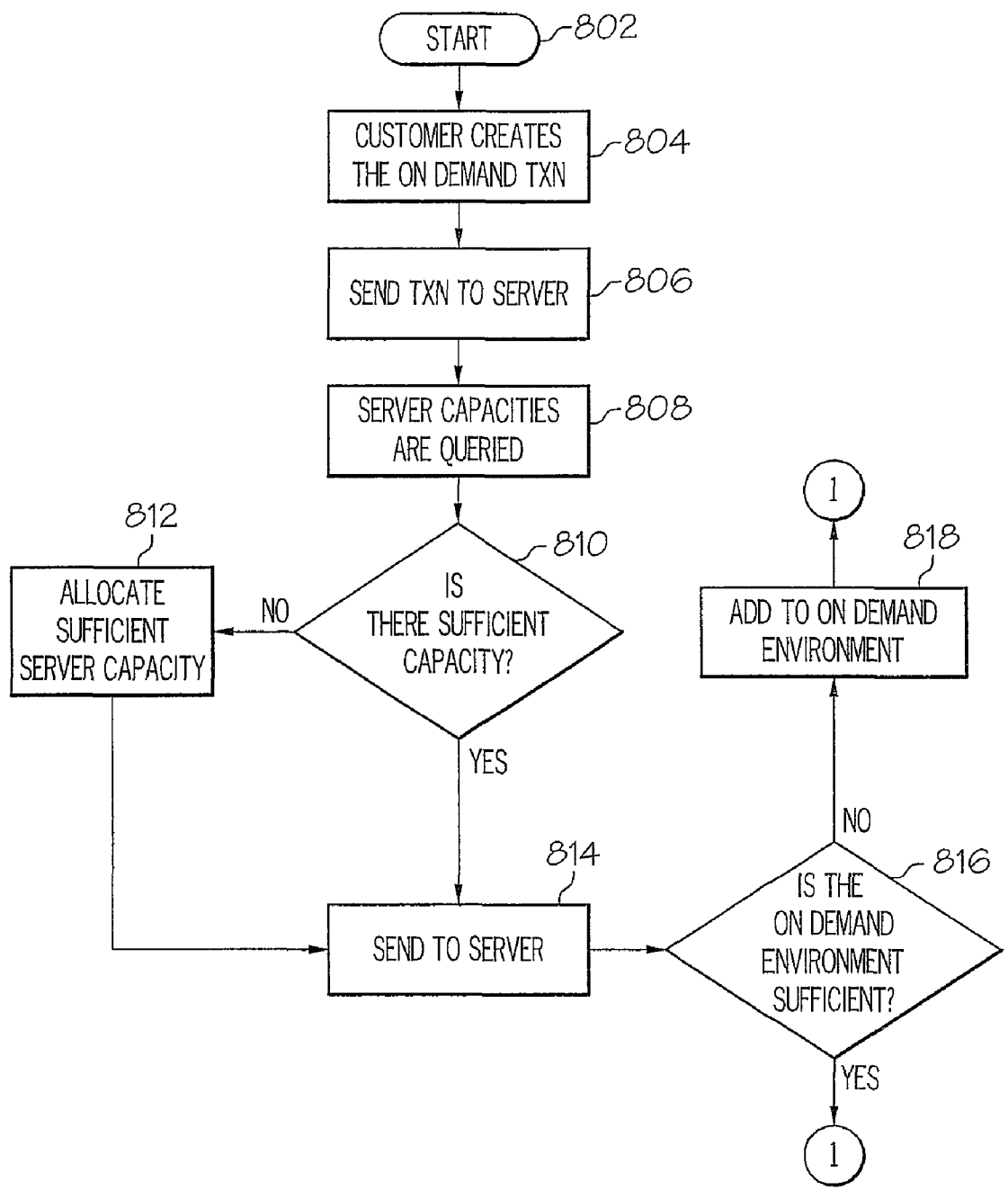
FIGS. 8a-b show a flow-chart showing steps taken to execute the steps shown and described in FIG. 4 using an on-demand service provider.
Figure 8B:
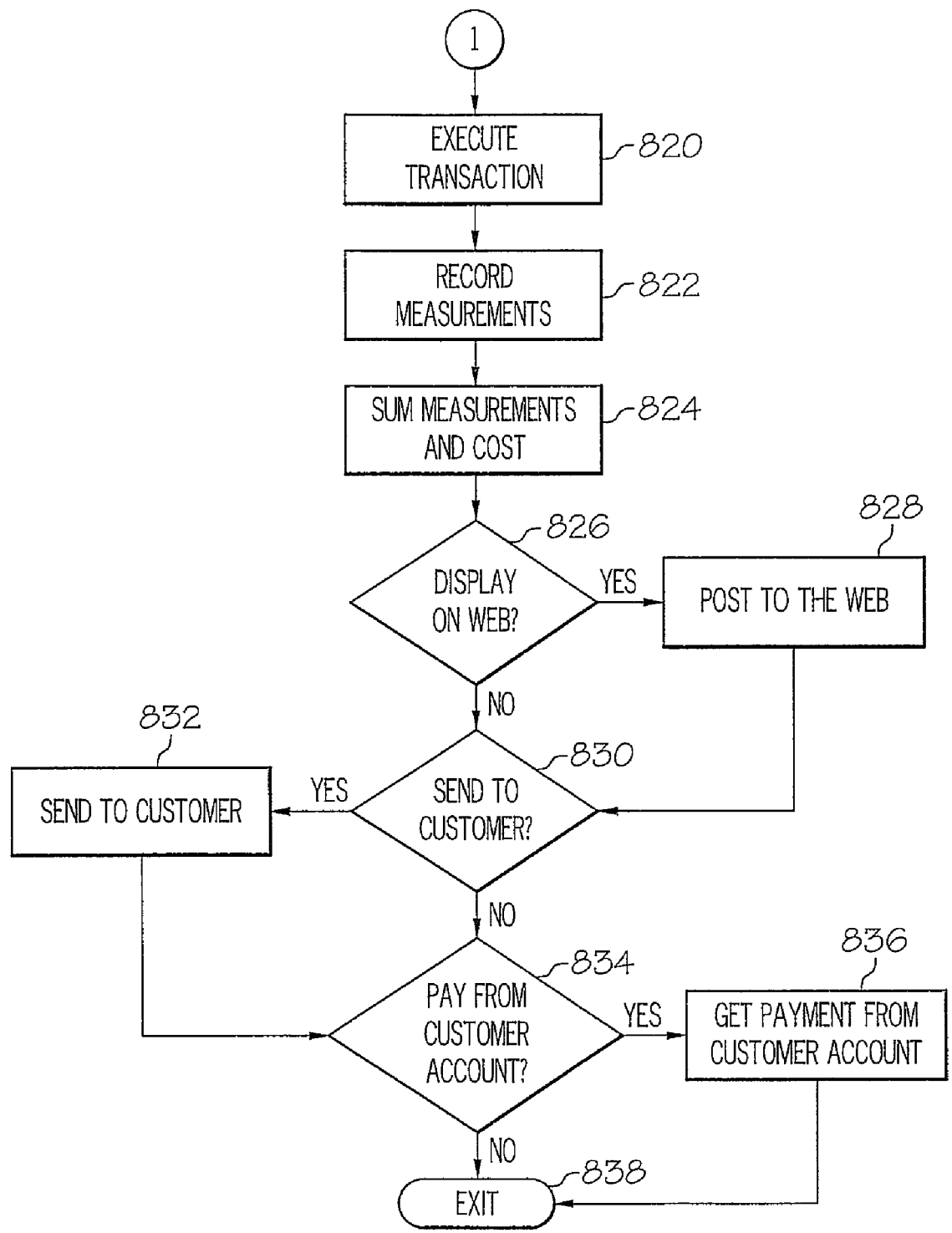

FIG. 4 is a high-level logical flowchart diagram illustrating an exemplary method of implementing meeting moderator failover and failback according to a preferred embodiment of the present invention. The process begins at step 400 and proceeds to step 402, which illustrates one of clients 102*a-n* (e.g., client 102*a*) scheduling an electronic meeting (e-meeting) by logging on to registration server 112 and accessing registration program 114. Client 102*a* determines whether or not the scheduled e-meeting will take advantage of a failover and failback policy (step 404). If client 102*a* determines that the scheduled e-meeting will not utilize a failover and failback policy, the process continues to step 406, which illustrates the process ending.

If client 102*a* determines that the scheduled e-meeting will utilize a failover and failback policy, the process continues to step 408, which depicts client 102*a* determining if the scheduled e-meeting will utilize a default or customized failover and failback policy. The determination is then indicated in reservation program 114 (steps 410 or 412), and the process proceeds to step 413.

Step 413 illustrates clients 102*a-n* logging on to e-meeting program 118 stored in memory 117 of meeting server 116 via e-meeting interface 320 to begin the e-meeting. For the purposes of discussion, assume that client 102*a* is the originally designated meeting moderator. If a new meeting moderator is required (e.g., client 102*a* has left the e-meeting or did not show up at the start of the meeting), the selected failover policy (default policy 108 or custom policy 110) is utilized and a new meeting moderator is selected (steps 414 and 416). If a new meeting moderator is not required, the process proceeds to step 418, which illustrates a determination made by meeting server 116 as to whether the e-meeting has ended. If the e-meeting has not ended, the process returns to step 414 and proceeds in an iterative fashion. If the e-meeting has ended, the process continues to step 420, which depicts the process ending.

The present invention includes, but is not limited to, a method, apparatus, and computer-usable medium for scheduling a meeting, determining a set of policies for selecting a replacement meeting moderator if an original meeting moderator is not present in the meeting, specifying the a set of policies for reestablishing control of the meeting to the original meeting moderator when the original meeting moderator rejoins the meeting, deciding whether to implement a default policy or a custom policy as the set of policies. The default policy includes examining a user directory, establishing a hierarchy ranking of a collection of meeting members, where the original meeting moderator holds the highest rank, and designating a member of the collection of meeting members as a replacement meeting moderator, where the member holds a next highest rank in the hierarchy ranking.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIG. 4, can be deployed as a process software from service provider server 124 to client computers (policy server 106, reservation server 112, meeting server 116, and directory server 120).

Referring then to FIG. 5, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether to the process software will be sent directly to user directories on their client computers (query block 536). If so, the user directories are identified (block 538). The process software is transferred directly to the user's client computer directory (block 540). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

The process for such VPN deployment is described in FIG. 6. Initiator block 602 begins the Virtual Private Network (VPN) process. A determination is made to see if a VPN for remote access is required (query block 604). If it is not required, then proceed to query block 606. If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it has been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is, the process software is divided into packets and each packet including the data and protocol is placed within another packet (block 622). When the process software arrives at the remote user's desktop, it is removed from the packets, reconstituted and then is executed on the remote user's desktop (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 638). Then build the large scale encryption into the VPN (block 640).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site user's desktop (block 636). The process then ends at terminator block 626.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made is the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

With reference now to FIG. 8, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method comprising:
   scheduling a meeting using one or more server computer systems;
   defining, using the one or more server computer systems, a set of custom policies comprising a failover policy and a failback policy instructing the one or more server computer systems to select a replacement meeting moderator in response to an absence of an original meeting moderator in the meeting, the failover policy specifying a custom hierarchy of one or more replacement meeting moderators, the failback policy specifying a custom policy for reestablishing control of the meeting with the original meeting moderator in response to the original meeting moderator rejoining the meeting;
   detecting during the meeting, by the one or more server computer systems, that the original meeting moderator is absent by one of the original meeting moderator leaving the meeting and the original meeting moderator failing to log on to the meeting; and
   designating based on the failover policy, by the one or more server computer systems, the replacement meeting moderator for the meeting in response to detecting that the original meeting moderator is absent in the meeting.

2. The method according to claim 1, further comprising:
   reestablishing control of the meeting with the original meeting moderator, based on the failback policy, in response to detecting, during the meeting, the original meeting moderator rejoining the meeting.

3. The method according to claim 1, further comprising:
   indicating, using the one or more server computer systems, that the set of policies will be utilized in the meeting.

4. The method according to claim 1, further comprising:
   assigning, using the one or more server computer systems, a default policy to the set of custom policies.

5. The method according to claim 4, wherein the default policy includes:
   examining, using the one or more server computer systems, a user directory;
   establishing, using the one or more server computer systems, the custom hierarchy of one or more replacement meeting moderators, the custom hierarchy comprising a plurality of meeting members within the user directory, wherein the original meeting moderator holds a highest rank in the custom hierarchy; and
   designating, using the one or more server computer systems, a member of the plurality of meeting members as the replacement meeting moderator, wherein the member holds a next highest rank in the custom hierarchy.

6. A system comprising:
   a processor;
   a data bus coupled to said processor; and
   a computer-usable medium embodying computer program code, the computer-usable medium being coupled to the data bus, the computer program code comprising instructions executable by the processor and configured for:
      scheduling a meeting;
      defining a set of custom policies comprising a failover policy and a failback policy for selecting a replacement meeting moderator in response to an absence of an original meeting moderator in the meeting, the failover policy specifying a custom hierarchy of one or more replacement meeting moderators, the failback policy specifying a custom policy for reestablishing control of the meeting with the original meeting moderator in response to the original meeting moderator rejoining the meeting;
      detecting during the meeting that the original meeting moderator is absent by one of the original meeting moderator leaving the meeting and the original meeting moderator failing to log on to the meeting; and
      designating, based on the failover policy, the replacement meeting moderator for the meeting in response to detecting that the original meeting moderator is absent in the meeting.

7. The system according to claim 6, wherein the instructions are further configured for:
   reestablishing control of the meeting with the original meeting moderator, based on the failback policy, in response to detecting, during the meeting, the original meeting moderator rejoining the meeting.

8. The system according to claim 6, wherein the instructions are further configured for:
   indicating that the set of policies will be utilized in the meeting.

9. The system according to claim 6, wherein the instructions are further configured for:
   assigning a default policy to the set of custom policies.

10. The system according to claim 9, wherein the default policy includes:
    examining a user directory;
    establishing the custom hierarchy of one or more replacement meeting moderators, the custom hierarchy comprising a plurality of meeting members within the user directory, wherein the original meeting moderator holds a highest rank in the custom hierarchy; and
    designating a member of the plurality of meeting members as the replacement meeting moderator, wherein the member holds a next highest rank in the custom hierarchy.

11. A computer-usable medium embodying computer program code, the computer program code comprising computer executable instructions configured for:
    scheduling a meeting;
    defining a set of custom policies comprising a failover policy and a failback policy for selecting a replacement meeting moderator in response to an absence of an original meeting moderator in the meeting, the failover policy specifying a custom hierarchy of one or more replacement meeting moderators, the failback policy specifying a custom policy for reestablishing control of the meeting with the original meeting moderator in response to the original meeting moderator rejoining the meeting;
    detecting during the meeting that the original meeting moderator is absent by one of the original meeting moderator leaving the meeting and the original meeting moderator failing to log on to the meeting; and
    designating, based on the failover policy, the replacement meeting moderator for the meeting in response to detecting that the original meeting moderator is absent in the meeting.

12. The computer-usable medium according to claim 11, wherein the embodied computer program code further comprises computer executable instructions configured for:
    reestablishing control of the meeting with the original meeting moderator, based on the failback policy, in response to detecting, during the meeting, the original meeting moderator rejoining the meeting.

13. The computer-usable medium according to claim 11, wherein the embodied computer program code further comprises computer executable instructions configured for:
   indicating that the set of policies will be utilized in the meeting.

14. The computer-usable medium according to claim 11, wherein the embodied computer program code further comprises computer executable instructions configured for:
   assigning a default policy to the set of custom policies.

15. The computer-usable medium according to claim 14, wherein the default policy includes:
   examining a user directory;
   establishing the custom hierarchy of one or more replacement meeting moderators, the custom hierarchy comprising a plurality of meeting members within the user directory, wherein the original meeting moderator holds a highest rank in the custom hierarchy; and
   designating a member of the plurality of meeting members as the replacement meeting moderator, wherein the member holds a next highest rank in the custom hierarchy.

16. The computer-usable medium according to claim 11, wherein said computer executable instructions are deployable to a client computer from a server at a remote location.

17. The computer-usable medium according to claim 11, wherein said computer executable instructions are provided by a service provider to a customer on an on-demand basis.

* * * * *